United States Patent [19]

Kanamori

[11] 4,273,682

[45] Jun. 16, 1981

[54] PRESSURE-SENSITIVE ELECTRICALLY CONDUCTIVE ELASTOMERIC COMPOSITION

[75] Inventor: Katsuhiko Kanamori, Hiratsukashi, Japan

[73] Assignee: The Yokohama Rubber Co., Ltd., Tokyo, Japan

[21] Appl. No.: 83,367

[22] Filed: Oct. 10, 1979

Related U.S. Application Data

[63] Continuation of Ser. No. 862,855, Dec. 12, 1977, abandoned.

[30] Foreign Application Priority Data

Dec. 24, 1976 [JP] Japan ................................ 51-155107
Dec. 12, 1977 [JP] Japan ................................ 52-148045

[51] Int. Cl.$^3$ .............................................. H01B 1/06
[52] U.S. Cl. .................................... 252/511; 338/114
[58] Field of Search ......................... 252/511; 338/114

[56] References Cited

U.S. PATENT DOCUMENTS

| 2,445,660 | 7/1948 | Bruestle | 338/114 X |
| 2,951,817 | 9/1960 | Meyers | 252/518 |
| 3,457,537 | 7/1969 | Hines | 252/511 |
| 3,509,296 | 4/1970 | Harshman et al. | 338/114 X |
| 3,918,020 | 11/1975 | Durocher | 252/511 |

Primary Examiner—Benjamin R. Padgett
Assistant Examiner—J. L. Barr
Attorney, Agent, or Firm—Armstrong, Nikaido, Marmelstein & Kubovcik

[57] ABSTRACT

Disclosed is a pressure-sensitive, electrically conductive elastomeric composition comprising a substrate composed of an organic flexible material and electrically conductive particles consisting of angle-chipped, roundish pebble-like particles of artificial graphite incorporated and dispersed therein. An elastomeric material comprising this composition has such a characteristic property that the electric resistivity is conspicuously and gradiently reduced under application of a pressure from the level maintained when no pressure is applied. This characteristic property is very durable and therefore, the material can be used advantageously for switch elements and the like.

6 Claims, 9 Drawing Figures

0.1mm

PRESSURE-SENSITIVE ELECTRICALLY CONDUCTIVE ELASTOMERIC COMPOSITION

This is a continuation of application Ser. No. 862,855, filed Dec. 12, 1977 now abandoned.

BACKGROUND OF THE INVENTION

The present invention relates to a pressure-sensitive electrically conductive elastomeric composition. More particularly, the invention relates to a pressure-sensitive, electrically conductive elastomeric composition providing elastomeric material thereof which has such a characteristic property that in the normal state where no pressure is applied, the composition is electrically insulating or highly resistive, but under application of a pressure, the composition is electrically conductive or little resistive.

Materials having such pressure-responsive conductivity are known in the art. For example, the specification of U.S. Pat. No. 2,044,080 discloses that when an electrically conductive material such as granulated carbon interposed between electrodes is pressed, the resistance (or resistivity) of the material is reduced. Further, the specification of U.S. Pat. No. 3,806,471 discloses that various semi-conductors may be used for improving characteristics of pressure-responsive materials, that granules can be agglomerated with a binder and that in order to reduce occurrence of the hysteresis phenomenon and prevent wearing of pressure-responsive materials, it is preferred that the shape of granules are uniform spherical or particulate. Still further, the specification of U.S. Pat. No. 3,710,050 discloses that a material comprising an electrically conductive powder and 20 to 50% by volume of a rubber powder has a good pressure-responsive conductivity and it can be used effectively.

In these conventional materials, however, since powders are used as they are in the state without using a dispersant such as a rubber and the like, there is inevitably involved a defect that these pressure-responsive, electrically conductive materials must be contained and stored in special space. Indeed, in the invention of the above-mentioned U.S. Pat. No. 3,806,417, the granules are agglomerated with a binder, but the flexibility of the material is still insufficient. Further, the specification of U.S. Pat. No. 2,305,717 proposes a method in which powders or granules are confined in spaces of cells of foamed bodies. According to this method, however, it is impossible to prevent fall-down of the powders or granules completely. This problem of fall-down of powders may be solved by coating surfaces of cells of foamed bodies as disclosed in the specification of U.S. Pat. No. 3,629,774, but in this case, the range of variation of the electric resistance of the resulting pressure-responsive conductive material is very narrow. More specifically, since the electric resistance in the normal non-pressed state is not sufficiently high and the ratio of the electric resistance in the normal nonpressed state to the electric resistance under application of a pressure is low, the material is not suitable for switch elements and the like.

It is known that some of electrically conductive composition comprising an electrically conductive powder such as metal, carbon and semi-conductor incorporated in an elastic material such as a rubber show some amounts of pressure conductive effect. The material of this type is excellent and advantageous over the above-mentioned powdery material or the powder or granule confined in a foamed body in the point that the material is flexible and has rubbery characteristics. However, with the material of this type, the object is basically not to attain a pressure-responsive electric conductivity. It has heretofore been conceived that it is a fatal defect involved in materials of the type comprising furnace black or acetylene black incorporated in an elastomer that variation of the resistance (not only by the change in the configuration but mainly by the change in the volume resistivity) is caused by compression or elongation imposed on the materials. As an invention utilizing this pressure-responsive electric conductivity, there can be mentioned, for example, a material disclosed in the specification of U.S. Pat. No. 3,801,839. This material is, however, defective in that the electric conductivity in the normal open state is high and the ratio of the change of the resistivity (sometimes referred to as "sensitivity" in this specification) is low. More specifically, if such pressure-responsive, electrically conductive rubber is used for a switch element, it is desired that the ratio of the resistivity in the non-pressed open state to the resistivity in the state compressed under application of a pressure is at least 10, preferably at least 100. In the material of the above-mentioned type, the compressive force necessary for realizing such conspicuous change of the resistivity is much higher than the level not causing irreversible changes in the strength and other properties of the material.

Pressure-responsive, electrically conductive materials including relatively coarse particles of carbon or metal are disclosed in, for example, the specifications of U.S. Pat. Nos. 2,951,817; 3,509,296; 3,578,733 and 3,952,352. Similar materials are disclosed in the specifications of U.S. Pat. Nos. 3,760,342 and 3,883,213, though these materials are not used in the field where pressurizing and releasing are repeated. When a filler having a particle size of 2.5 to 25 $\mu$m is used in these conventional materials, good characteristics can be expected in the initial stage of actual application. However, these materials are still insufficient in the durability of the pressure-responsive characteristic. More specifically, in case of switch elements, it is generally required that the operation should be repeated at least one million times, but materials of this type can endure the operation repeated only several hundred thousand times at highest. Similarly in case of a material including a fine metallic powder as disclosed in Japanese Patent Application Laid-Open Specification No. 74-114798, the durability is still insufficient.

SUMMARY OF THE PRESENT INVENTION

It is a primary object of the present invention to provide a pressure-sensitive, electrically conductive elastomeric composition providing a pressure-responsive, electrically conductive elastomeric material in which the electric resistivity is remarkably reduced by compression under application of a pressure from the level in the normal non-compressed state and the electric resistivity decreases smoothly in proportion to the increase of the compressing force.

Another object of the present invention is to provide a pressure-sensitive, electrically conductive elastomeric composition providing a pressure-sensitive, electrically conductive elastomeric material which has low noise level and has an excellent durability to repeated compression and release from compression.

Other objects, features and advantages of the present invention will become apparent from the following detailed description.

In accordance with the present invention, the foregoing objects can be attained by a pressure-sensitive, electrically conductive elastomeric composition consisting essentially of an organic flexible material and electrically conductive particles incorporated and dispersed therein, the electrically conductive particles being angle-chipped, roundish pebble-like particles of artificial graphite. Namely, the composition of the present invention is characterized in that electrically conductive particles of artificial graphite which have an angle-chipped, roundish and nodule-like configuration are used as the filler.

DETAILED DESCRIPTION OF THE PREFERRED EMBODIMENTS

Figure 1:
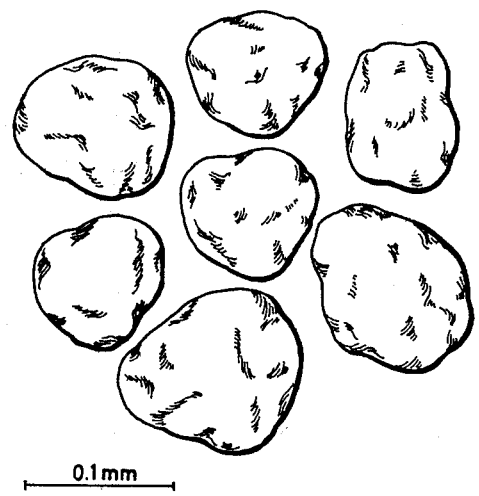
FIG. 1 is a diagram reproduced from a photograph taken under a scanning type electron microscope, which illustrates the shape and configuration of artificial graphite particles that are used for the composition of the present invention.

As is seen from FIG. 1, which is a diagram reproduced from a photograph of a typical instance of the filler of the present invention taken under a scanning type electron microscope, the respective particles of the filler have a shape resembling a gravel or a potato-like shape.

This filler may be prepared by impregnating a powder of petroleum coke or coal coke with pitch, calcining the impregnated powder, repeating pulverization, impregnation and calcination according to need, graphitizing the powder at a temperature approximating to 3000° C. to form artificial graphite, pulverizing the resulting artificial graphite, abrading the pulverized product by using a mortar, a low speed ball mill or a vessel having agitating vanes, and sieving the particles to remove finer particles and obtain particles uniform in the size. Of course, the intended filler may be prepared by using an ordinary pulverizing machine if only abrading conditions causing the so-called abrasive pulverization are adopted.

One of charactristic features of the present invention resides in the shape or configuration of electrically conductive particles described in detail hereinafter. This characteristic feature will now be described.

Figure 2:
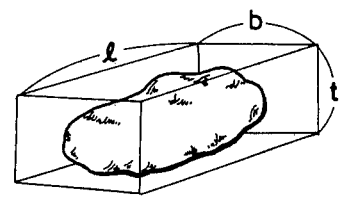
FIG. 2 is a diagram illustrating the proportionality of particles.

The shape or configuration of pulverized or abraded particles of this type is first of all characterized by the three-dimensional proportionality in the respective particles. This three-dimensional proportionality is first described by reference to FIG. 2. As is seen from FIG. 2, a circumscribed rectangular parallelepiped having a width b, a length l and a height t is considered for each particle. It is known that the proportionality can be expressed by using these values b, l and t according to Zingg's shape factor (F) represented by the following formula:

$$F = (l \cdot t / b^2)$$

or Williams' shape index (W) represented by the following formula:

$$W = 1 - (l \cdot t / b^2)$$

(in case of $b^2 > l \cdot t$), or $$W = (b^2 / l \cdot t) - 1$$

(in case of $b^2 \leq l \cdot t$).

The above shape factor and shape index are illustrated in, for example, "Powder and Particle Engineering" written by Shigeo Miwa and published by Asakura Shoten (Tokyo, Japan) in 1972.

Of course, particles having the same value of the shape factor or shape index are different more or less with respect to the practical shape. However, from results of experiments made by me on various graphite materials (natural graphite, inclusive), it has been confirmed that the proportionality can be sufficiently defined by either of the above-mentioned shape factor or shape index. Namely, in the present invention, the proportionality is used as a factor for excluding graphite materials not suitable for attaining the objects of the present invention, for example, scaly particles as of natural graphite (reduction of the resistivity in the open state takes place) or long particles as seen in a pulverized product of coke-like porous graphite (reduction of the durability is caused). Particles of a filler suitable for the present invention have a Williams' shape index in the range of from −0.2 to +0.2, preferably from −0.1 to +0.15. Since the shape index differs in the respective particles, the above value of the shape index must be interpreted as a mean value of at least 50 particles (several visual fields under an electron microscope) or it must be interpreted that the majority of particles have a shape factor in the above-mentioned range. At any rate, it is not preferred that particles having a shape index (W) smaller than −0.3 or larger than +0.3 are present in a large amount, for example, at least about 20% based on the number. In the present invention, the shape index is a secondary factor coming next to the degree of roundness of particles described hereinafter. More specifically, if artificial graphite that is used in the present invention is pulverized to an appropriate size, in many cases the shape index is included in the range of from −0.2 to +0.2, and if a starting graphite material is too porous and the shape index (W) of the pulverized product thereof is outside the above range, particles satisfying the condition of the degree of roundness described hereinafter cannot be obtained even by the abrading treatment.

Figure 3:
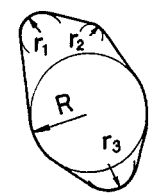
FIG. 3 is a diagram, illustrating the degree of roundness of Wadell method.

Next, the degree of roundness, which is a factor indicating the degree of chipping angles, will now be mentioned. FIG. 3 is a diagram illustrating the degree of roundness of Wadell method. The degree (D) of roundness of Wedell method is represented by the following formula:

$$D = \frac{\sum_{i=1}^{n} r_i}{R \cdot n}$$

wherein R stands for the radius of a maximum inscribed circle of the projected contour of a particle, n designates the number of angles, and $r_i$ stands for the curvature radius of each angle ($r_1, r_2, \ldots r_n$).

This degree of roundness of Wadell is explained in detail in the above-mentioned reference literature, "Powder and Particle Engineering".

The degree (D) of roundness of Wadell method is in the range of from 0 to 1, and in case of D=0, all the angles on the contour of the particle are sharp and in case of D=1, the roundness is complete. One of features of the present invention is that particles of artificial graphite to be used are angle-chipped and roundish particles. More specifically, the particles have a value D approximating to 1. It must be noted that particles having a value D of 1 are not limited to particles having a circular projected shape but even particles having a rectangular projected shape (the length of the rectangle is optional and it does not matter however long the rectangle may be) including a semi-circle having a diameter equal to the width of the rectangle on each of both the ends of the rectangle have a value D of 1. Since the roundness degree is a factor indicating the degree of chipping angles as pointed out hereinbefore, shapes of particles cannot be completely defined unless the shape index (W) indicating the proportionality is considered in addition to the roundness degree (D). However, as described hereinbefore, in practising the present invention, the shape index (W) need not be taken into consideration if only the condition of the roundness degree (D) is satisfied.

In the present invention, it is preferred that the roundness degree (D) of artificial graphite particles to be used is at least 0.5, especially at least 0.7. This value is a mean value calculated from values of at least 50 individual particles (namely, several photographs of different visual fields are taken under an electron microscope and the mean value is determined based on these phtographs). When the roundness degree (D) is lower than 0.4, no substantial effect of improving the critical compressive force that can be resisted by the pressure-sensitive conductive elastic material or the durability to repeated compression can be attained by rounding angles by the abrading treatment and a significant effect is manifested when the roundness degree (D) exceeds the level of about 0.5. When the roundness degree exceeds 0.7, no substantial difference of the durability is observed.

Substantially completely spherical particles (D≈1 and W=0) are included in the scope of the present invention. However, it is very difficult to obtain such particles according to the method comprising pulverizing artificial graphite and abrading the pulverized produce, and the improvement effect attained by the use of such particles is not so conspicuous though the preparation of such particles is very troublesome.

Spherical particles may also be preapred according to a method comprising spraying molten pitch to form liquid drops and calcining these drops in the state floating in air. These spherical particles are of course superior to less rounded particles of the same size prepared by pulverizing method with respect to durability. However, in many cases, these completely spherical particles are somewhat inferior to particles slightly incomplete in the roundness with respect to noises (irregular and abrupt changes of the resistivity) generated while the compressive force is changed.

The reason for exclusion of natural graphite as the filler is as follows:

Namely, since the laminar structure of graphite crystals is well-developed in scaly graphite which is a high-quality natural graphite, it cannot be formed into particles having a shape satisfying the above-mentioned requirement of the present invention according to the abrading treatment. Some mud-like graphite, another instance of natural graphite, is included in the particles having a shape satisfying the requirement of the present invention. However, even if such particles are collected and used, a pressure-sensitive conductive elastomeric material having a good durability cannot be obtained because these particles are readily crumbled.

The filler that is used in the present invention should also satisfy the following requirement of the degree of size (particle size and diameter). SInce artificial graphite has in general a porous structure and cracks and voids are present in large masses of artificial graphite, it is preferred to pulverize artificial graphite until the resulting particles have a degree of size passable through a sieve having a mesh size of 180 μm (sieve No. 80 according to ASTM E11-70 or Tyler's 80-mesh sieve), especially a degree of size passable through a sieve having a mesh size of 160 μm or more preferably a degree of size passable through a sieve having a mesh size of 150 μm (sieve No. 100 according to ASTM). However, such fine particles as passable through a sieve having a mesh size of 45 μm (sieve No. 325 according to ASTM or Tyler's 325-mesh sieve) or especially passable through a sieve having a mesh size of 40 μm are not preferred because the proportionality of the shape is readily lost. Further, incorporation of such fine particles results in reduction of the resistivity in the open state or prevents gradient change of the resistivity under application of a pressure while causing such undesirable phenomenon as generation of noises.

In order to enhance the ratio of the change of the resistivity, it is ordinarily necessary not only to adjust the degree of size of the particles within the above-mentioned preferred range but also to take the particle size distribution into consideration. More specifically, in order to attain the above object, it is not preferred to use particles covering entirely the particle size range passable through a sieve having a mesh size of 180 μm but not passable through a sieve having a mesh size of 40 μm, preferably 45 μm, but it is preferred to use particles having a narrower particle size distribution range, namely particles collected by using two sieves having more approximate mesh sizes. In this case, the average particle size, namely the combination of two sieves used for collection of particles, is determined depending on the dimensional factors such as the thickness of the pressure-sensitive conductive elastomeric material and the spacing between the electrodes and the intended sensitivity as is well known in the art.

According to experiments made by me, it was confirmed that good results are obtained when the ratio of mesh sizes in two sieves used for collection of particles is within a range of from 1: about 1 to 1: about 1.7 (more specifically, it is recommended to use sieves Nos. 80 and 140, 100 and 170, 120 and 200, . . . or 200 and 325 according to ASTM E11-70 in combination).

As the insulating organic flexible material that is used as the substrate in the present invention, there can be mentiond, for example, ordinary rubbers such as natural rubber, styrene-butadiene rubber, chloroprene rubber and nitrilebutadiene rubber, elastomers such as chlorosulfonated polyethylene and silicone rubber, thermoplastic elastomers such as ethylene-vinyl acetate copolymers, and plasticizer-containing thermoplastic resins such as composition comprising 100 parts by weight of polyvinyl chloride and 60 parts by weight of a mixture containing dioctyl phthalate and butylbenzyl phthalate in equal amounts. Still further, a liquid rubber such as RTV silicone rubber (manufactured by GE Co.) can be used as the substrate. In the present invention, it is preferred to use a substrate that can resist a high-intensity electric field, that has a good insulating property and that has such a property that the permanent set is hardly caused.

The composition of the present invention consists essentially of such substrate and the above-mentioned electrically conductive particles. The amount of the electrically conductive particles incorporated and dispersed into the composition is appropriately changed depending on the desired characteristics and sensitivity or on such factors as the kind of the elastomer or the like as the substrate, the quantity of a low-molecular-weight substance such as a plasticizer absorbed in the electrically conductive particles, sheeting or other molding conditions and rubber-curing conditions (for example, the curing is conducted under an elevated pressure or atmospheric pressure). In the present invention, however, good results are in general obtained when particles of artificial graphite are incorporated in an amount of 25 to 55% by volume, preferably 25 to 45% by volume, especially preferably 30 to 40% by volume, based on the total composition.

The apparent particle density (also called "lyophobic particle density") is a most appropriate conversion factor for calculating the weight proportion customarily used for compositions from the volume occupancy ratio. As a result of actual measurements made by me, it was confirmed that the apparent particle density of artificial graphite particles of the present invention is in the range of from about 1.75 to 1.90 and the mean value is about 1.8. Since the density of the substrate is usually in the range of from 1.0 to 1.2, when the above-mentioned volume occupancy ratio of artificial graphite particles is converted to the weight proportion, it is seen that the amount of artificial graphite particles is 33 to 60% by weight, ordinarily 39 to 55% by weight, based on the total composition. When the proportion of artificial graphite particles is below this range, no electric conductivity is manifested under application of such a compressive force as will not cause fracture of the material. On the other hand, when the amount of artificial graphite particles is too large beyond the above range, the resistivity in the open state is reduced and the ratio of the resistivity in the open state to the resistivity under application of a pressure is reduced, and therefore, the intended objects of the present invention may not be attained.

Other fillers such as plasticizer and a stabilizer may further be incorporated into the composition of the present invention so far as the intended effects of the present invention can be attained.

The composition of the present invention is molded according to sheeting or other optional molding method and is cured according to need, whereby a pressure-sensitive, electrically conductive elastomeric material is formed. This material may be used as a pressure-sensitive switch element, for example, a contact of a pressure-sensitive switch such as a key board switch, a mat switch of an automatic door, a ribbon switch disposed on a road for detecting the number of passing vehicles or a pressure-measuring switch using pressure-sensitive, electrically conductive rubbers differing in the sensitivity. Further, the pressure-sensitive, electrically conductive elastomeric material of the present invention can be used as a pressure-sensitive element of a pressure or load converter, a buffer contact of a switch or relay, a non-spark contact or as a protector for a slide contact.

Electrically conductive particles present in a flexible insulating material such as an elastomer or plasticized plastic material are caused to have contact with one another when the entire structure is compressed, whereby conducting paths are formed and the resistivity of the material is reduced. In the present invention, since artificial graphite particles have a nodule-like shape, the structure of particles per se is not destroyed even by repeated compression and in this point, the artificial graphite particles of the present invention can be distinguished from particles of carbon black or carbonyl nickel which are present in the matrix in the form of agglomerates or aggregates. Further, partial destroy of the structure by concentration of the stress in contact points of particles, such as seen in as-pulverized particles having angles, cannot be caused at all in the artificial graphite particles of the present invention. Accordingly, the characteristics of the pressure-responsive, electrically conductive elastic material of the present invention can be maintained stable even if the cycle of compression and releasing is repeated many times. Although preparation of completely spherical particles from artificial graphite that is used in the present invention is difficult because of the process limitations, even if the artificial graphite particles are not completely spherical, because of the self-lubricating property of graphite and the relatively high softness thereof, the material will probably be able to resist such repetition of compression and releasing. Furthermore, generation of noises, i.e., occurrence of irregular changes of the resistivity, that is observed when the compressive force is gradually changed in case of spherical metal particles, such as atomized powder of stainless steel, is not caused to occur in the material of the present invention. In short, the resistivity is gradiently changed in the material of the present invention.

As will be apparent from the foregoing illustration, the pressure-responsive, electrically conductive elastomeric material according to the present invention is characterized in that the properties thereof are hardly changed even by repetition of the cycle of compression and releasing and the electric resistance is gradiently changed depending on the pressure. Accordingly, when the material according to the present invention is used as an element of a pressure-sensitive switch or load sensor or as a buffer contact or non-spark contact of a switch or relay, a good durability can be expected.

The present invention will now be described in detail by reference to the following Examples.

EXAMPLE 1

Powdery coke was impregnated and hardened with pitch, pressed and calcined. These pitch-impregnating and calcining treatments were repeated, and the resulting calcination product was graphitized in an electric furnance maintained at 2600° C. The resulting artificial graphite was pulverized. Abrasive rounding of the resulting artificial graphite particles was accomplished by treating the pulverized particles having an appropriately adjusted particle size in a mixer comprising a cylindrical vessel having agitating vanes attached to the bottom thereof.

The as-pulverized graphite particles and various rounded particles differing in the degree of abrasion were classified by collecting particles passable through a sieve having a mesh size of 105 μm (Tyler's 150-mesh sieve) but not passable through a sieve having a mesh size of 63 μm (Tyler's 250-mesh sieve). By using each of the so prepared fillers, compositions having a recipe shown in the following Table 1 were prepared.

TABLE 1

| Component | Parts by Weight |
|---|---|
| Silicone rubber (KE650-U manufactured by Shin-Etsu Kagaku, Japan) | 100 |
| Filler | 70 |
| Peroxide master batch (C-3 manufactured by Shin-Etsu Kagaku, Japan) | 3.4 |

The above compositions were molded into sheets having a thickness of 0.5 mm according to a customary method, respectively, and the properties and durability of the resulting sheets were determined and evaluated according to the following methods.

A sheet sample was placed on a flat electrode plate and a rod-like electrode having a flat top end having a diameter of 3 mm was pressed on the sample, and the pressure by the rod-like electrode and the electric resistance between the two electrodes were determined. The life at the durability test was evaluated based on results of observation of the relation between the pressure and the electric resistance or abrupt increase of noises (both the factors tend to change abruptly at a certain critical point). The maximum compressive force applied was 1 Kgf (9.8 N). Obtained results are shown in Table 2 below.

TABLE 2

| Filler | Roundness Degree (D) | Shape Index (W) | Durability Repetition Frequency (times) | Ovservation | Remarks |
|---|---|---|---|---|---|
| a | 0.25 (~0.33) | −0.06 | <1,000 | sensitivity reduction and noise increase observed from initial stage | * |
| b | 0.34 (0.27–0.48) | −0.05 | ~500,000 | noises generated after test repeated scores of thousands of times; sensitivity gradually reduced no substantial difference from filler b case | |
| c | 0.43 (0.32–0.51) | −0.10 | ~500,000 | above; sensitivity reduction relatively delayed but more abrupt noises generated when test was repeated 500,000 times; then abrupt sensitivity reduction took place | |
| d | 0.47 (0.41–0.53) | −0.05 | ~800,000 | | |
| e | 0.51 (0.46–0.64) | −0.07 | ~1,000,000 | Conductivity abruptly reduced on generation of noises test repeated 1,000,000 times; noise generation observed with some samples test repeated 1,000,000 times; no change observed test repeated 1,000,000 times; no change observed | |
| f | 0.61 (0.54–0.67) | ±0.00 | >1,000,000 | | |
| g | 0.72 (0.60–0.75) | −0.03 | >1,000,000 | | |
| h | 0.86 (0.73–0.90) | −0.02 | >1,000,000 | | |

*as-pulverized, non-abraded filler
Notes: Data on the shape shape index (W) are given for reference's sake.

Figure 4:
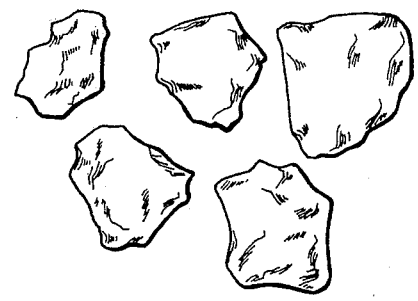
FIG. 4 is a diagram reproduced from a photograph taken under a scanning type electron microscope, which illustrates the shape and configuration of artificial graphite particles.
Figure 4:
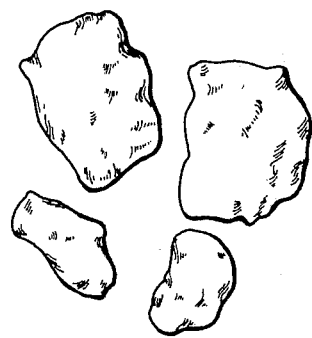
Figure 4:
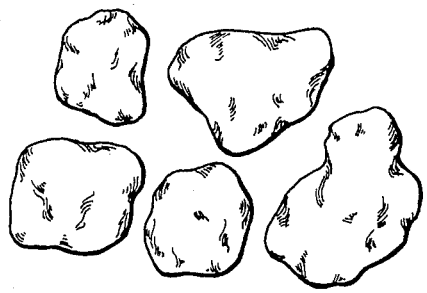
Figure 4:
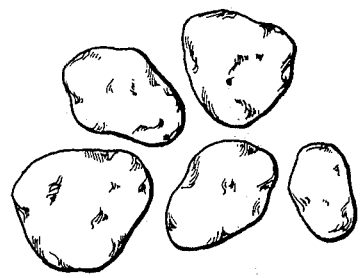
Figure 5:
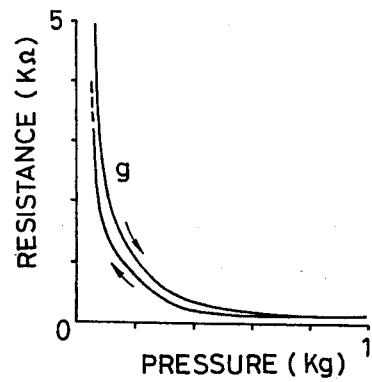
FIGS. 5 to 9 are diagrams, illustrating the pressure-sensitive characteristic, namely the relation between the pressure (or compressive force) and the resistance (or resistivity).

For better illustration of the state and condition of particles of the filler, diagrams reproduced from scanning type electron microscope photographs of some instances of the filler are attached. More specifically, FIGS. 4-(a), 4-(b), 4-(d) and 4-(f) illustrate the state and condition of particles of the fillers a, b, d and f shown in Table 2, respectively. Further, the filler g shown in Table 2 corresponds to the filler shown in FIG. 1. Still further, the relation between the pressure and the electric resistance in the filler g is illustrated as one of pressure-sensitive characteristics in FIG. 5.

EXAMPLE 2

Figure 6:
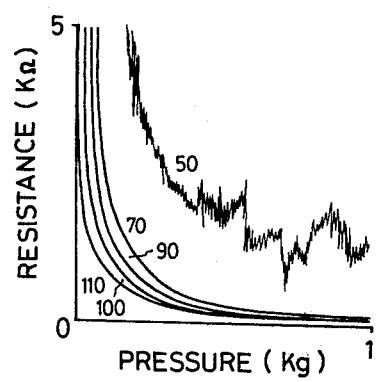

Compositions were prepared from the silicone rubber and peroxide master batch shown in Table 1 and the filler g shown in Table 2 in the same manner as described in Example 1 except that the amount of the filler g incorporated was changed to 50, 70, 90, 100 or 110 parts by weight. Then, the compositions were tested in the same manner as described in Example 1. The observed relation between the pressure and the electric resistance is shown in FIG. 6, which illustrates only results obtained when the pressure was gradually increased. In FIG. 6, numerical values affixed to the respective curves indicate amounts (parts by weight) of the incorporated filler g. At the durability test, it was found that all the samples except one in which the amount incorporated of the filler g was 50 parts by weight could resist more than 1,000,000 cycles of repeated compression and releasing.

EXAMPLE 3

When the filler g used in Example 1 was sieved, various particles differing in the particle size were collected by using various combinations of upper and lower sieves differing in the mesh size. Combinations of the sieves used are shown in the following Table 3.

TABLE 3

| Filler | Mesh Size (μm) | |
|---|---|---|
| | Upper Sieve | Lower Sieve |
| i | 180 | 45 |
| j | 150 | 63 |
| g | 105 | 63 |
| k | 105 | 75 |

Notes: In each filler, the degree of roundness was adjusted to 0.60 to 0.80.

Figure 7:
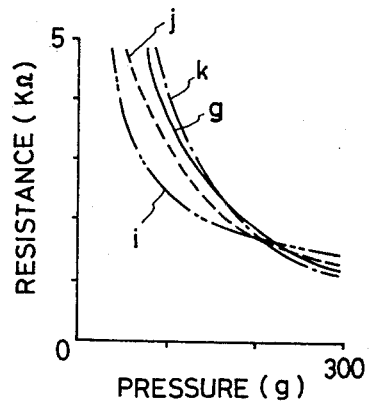

By using the fillers shown in Table 3, cured sheets having a thickness of 0.7 mm were prepared according to the recipe shown in Table 1 in the same manner as described in Example 1. The physical properties of each sheet were determined by placing the sheet between a plate electrode and a rod electrode having a spherical top end having a radius of 15 mm. A maximum pressure applied was 300 g. The observed relation between the pressure and the electric resistance is shown in FIG. 7 (only data obtained when the pressure was gradually increased are shown in FIG. 7). It was found that each sheet could resist more than 1,000,000 cycles of repeated compression and releasing at the durability test. In contrast, in case of a sample prepared by using as-pulverized particles, for example, the filler as described in Example 1, the durability did not exceed 200,000 cycles of repeated compression and releasing irrespective of the particle size distribution range.

EXAMPLE 4

A commercially available graphite crucible material was pulverized in a mortar, and the pulverized product was abraded in the same mortar. Particles passable through a sieve having a mesh size of 105 μm but not passable through a sieve having a mesh size of 63 μm were collected from the abraded product. The number average roundness degree of the so obtained filler was 0.71.

Figure 8:
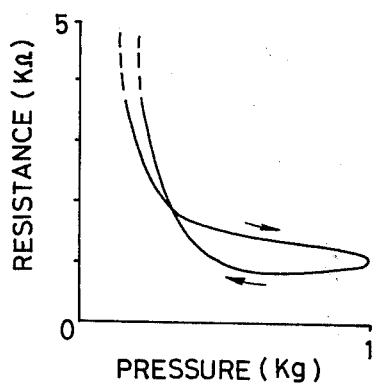

Then, 100 parts by weight of the filler was incorporated into 100 parts by weight of a plastisol formed by dispersing polyvinyl chloride (Geon 121 manufactured by Japan Geon Co., Japan) in an equal amount of dioctyl phthalate, and the composition was heated on a metal plate to form a sheet having a thickness of 0.6 mm. The so formed sheet was placed between a metal sheet and a 120-mesh wire gauze and the sheet was pressed by a rod having flat top and a diameter of 6 mm. As a result, characteristics as shown in FIG. 8 were observed. When compression was repeated at a maximum pressure of 1 Kg, it was found that the sheet could resist about 500,000 cycles of repeated compression and releasing. For comparison, a sheet prepared by using the as-pulverized and non-abraded filler having the same particle size distribution (having a roundness detree of 0.25 to 0.30) was subjected to the durability test. It was found that in case of this comparative sheet, noises were large when the cycle of compression and releasing was repeated about 1,000 times and the durability was less than 50,000 cycles of repeated compression and releasing.

EXAMPLE 5

Commercially available artificial graphite powder, which had been pulverized to a size passable through a sieve having a mesh size of 250 μm, was charged in a pot mill together with porcelain balls having a small diameter, and the graphite powder was subjected to a rolling abrading treatment. The abraded powder was passed through a sieve having a mesh size of 150 μm and then through a sieve having a mesh size of 45 μm, to remove coaser and finer particles. The average roundness degree of the so obtained filler was 0.66 and the majority of the abraded particles had a roundness degree of at least 0.5. Then, 90 parts by weight of the so obtained filler was incorporated into the same amount of toluene and the mixture was added to 100 parts by weight of RTV silicone rubber (TSE 350-5 RTV manufactured by Toshiba Silicone, Japan). Then, 0.5 parts by weight of a curing agent (CE 61 manufactured by Toshiba Silicone, Japan) was added to the composition and defoaming was carried out under a reduced pressure. The composition was then cast into a mold, toluene was removed and curing of the composition was performed. The resulting sheet had a thickness of 0.9 mm.

A pair of comb-like electrodes were attached onto an insulating plate according to a customary technique of preparing printed circuit boards so that teeth of both the electrodes were engaged with each other. The width of each tooth was 0.3 mm and the spacing between every two adjacent teeth was 0.5 mm. Accordingly, the tooth pitch in every comb-like electrodes was 1.6 mm. The thickness of each electrode was about 50 μm.

The above sheet was placed on the engaged electrodes and covered with an insulating film having a thickness of 0.1 mm. A rod having a spherical top end having a radius of 15 mm was pressed down onto the insulating film.

Figure 9:
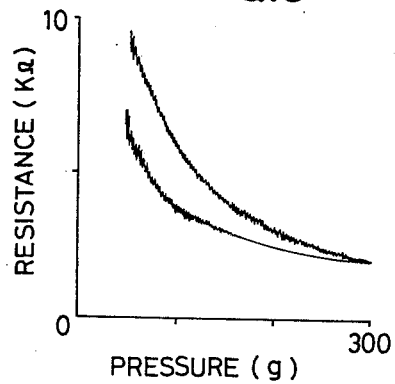

The pressure-responsive characteristics of the sheet are shown in FIG. 9. At this durability test, it was found that when the sheet was subjected to more than 1,000,000 cycles of repeated compression and releasing, the characteristics were hardly changed without generation of noises.

What is claimed is:

1. A pressure-sensitive, electrically conductive elastomeric composition consisting essentially of a substrate composed of an organic flexible material and electrically conductive particles incorporated and dispersed therein, wherein said electrically conductive particles are angle-chipped, roundish pebble-like particles of artificial graphite having: (a) a Wadell roundness of at least 0.7; (b) a size passable through a sieve having a mesh size of 180 μm but not passable through a sieve having a mesh size of 40 μm; and (c) a particle size distribution such that the ratio of the size of the minimum particle to the size of the maximum particle is in the range of 1:1 to 1:1.7.

2. A pressure-sensitive composition as set forth in claim 1, wherein the organic flexible material is a silicone rubber.

3. A pressure-sensitive composition as set forth in claim 1, wherein the organic flexible material is a polyvinyl chloride containng a plasticizer incorporated therein.

4. A pressure-sensitive composition as set forth in claim 1, wherein the artificial graphite particles have a degree of size passable through a sieve having a mesh size of 160 μm but not passable through a sieve having a mesh size of 45 μm.

5. A pressure-sensitive composition as set forth in claim 1, wherein the amount of the artificial graphite particles is 25 to 55% by volume based on the composition.

6. A pressure-sensitive composition as set forth in claim 1, wherein the amount of the artificial graphite particles is 25 to 45% by volume based on the composition.

* * * * *